United States Patent
Ishizuka

(10) Patent No.: US 10,040,949 B2
(45) Date of Patent: Aug. 7, 2018

(54) THERMOSETTING POWDER COATING MATERIAL AND COATED ARTICLE

(71) Applicant: FUJI XEROX CO., LTD., Tokyo (JP)

(72) Inventor: Takahiro Ishizuka, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 294 days.

(21) Appl. No.: 14/806,039

(22) Filed: Jul. 22, 2015

(65) Prior Publication Data

US 2016/0280930 A1    Sep. 29, 2016

(30) Foreign Application Priority Data

Mar. 23, 2015   (JP) ................................. 2015-059956

(51) Int. Cl.
     *C09D 5/03*      (2006.01)
     *C09D 133/06*      (2006.01)
     *C09D 125/14*      (2006.01)

(52) U.S. Cl.
     CPC .............. *C09D 5/031* (2013.01); *C09D 5/035* (2013.01); *C09D 125/14* (2013.01); *C09D 133/066* (2013.01)

(58) Field of Classification Search
     CPC ....... C09D 5/03; C09D 5/031; C09D 133/066
     See application file for complete search history.

(56) References Cited

U.S. PATENT DOCUMENTS 9,382,430 B2 *   7/2016   Ishizuka ................ C09D 5/031

FOREIGN PATENT DOCUMENTS

| CN | 1120058 A | 4/1996 |
|---|---|---|
| CN | 1384164 A | 12/2002 |
| CN | 1854126 A | 11/2006 |
| JP | H11-60998 A | 3/1999 |
| JP | H11-80604 A | 3/1999 |
| JP | 2007-186690 A | 7/2007 |

OTHER PUBLICATIONS

Oct. 19, 2017 Office Action issued in Chinese Application No. 201510571490.5.

* cited by examiner

*Primary Examiner* — Vickey Nerangis
(74) *Attorney, Agent, or Firm* — Oliff PLC

(57) ABSTRACT

A thermosetting powder coating material includes powder particles containing a mixture of a vinyl resin A including a block isocyanate group and a carboxyl group and a vinyl resin B including a hydroxyl group and a carboxyl group, or a vinyl resin C including a block isocyanate group, a hydroxyl group and a carboxyl group, wherein a content of the isocyanate group is from 0.4 mmol/g to 1.4 mmol/g, and a functional group molar ratio of [NCO/(COOH+OH)], which is obtained by dividing the content of the isocyanate group by a total content of the hydroxyl group and the carboxyl group, is from 0.5 to 1.2.

20 Claims, No Drawings

THERMOSETTING POWDER COATING MATERIAL AND COATED ARTICLE

CROSS-REFERENCE TO RELATED APPLICATIONS

This application is based on and claims priority under 35 USC 119 from Japanese Patent Application No. 2015-059956 filed Mar. 23, 2015.

BACKGROUND

1. Technical Field

The present invention relates to a thermosetting powder coating material and a coated article.

2. Related Art

In recent years, since a small amount of volatile organic compounds (VOC) are discharged in a coating step and a powder coating material which is not attached to a material to be coated may be collected and reused after the coating, a powder coating technology using a powder coating material is given attention from the viewpoint of global environment protection. Accordingly, various powder coating materials are being investigated.

SUMMARY

According to an aspect of the invention, there is provided a thermosetting powder coating material including:

powder particles containing;

a mixture of a vinyl resin A including a block isocyanate group and a carboxyl group and a vinyl resin B including a hydroxyl group and a carboxyl group, or a vinyl resin C including a block isocyanate group, a hydroxyl group and a carboxyl group, wherein a content of the isocyanate group is from 0.4 mmol/g to 1.4 mmol/g, and a functional group molar ratio of [NCO/(COOH+OH)], which is obtained by dividing the content of the isocyanate group by a total content of the hydroxyl group and the carboxyl group, is from 0.5 to 1.2.

DETAILED DESCRIPTION

Hereinafter, exemplary embodiments as examples of the invention will be described in detail.

Thermosetting Powder Coating Material

A thermosetting powder coating material according to the exemplary embodiment (hereinafter, also referred to as a "powder coating material") includes powder particles which contain a mixture of a vinyl resin A including a block isocyanate group and a carboxyl group with a vinyl resin B including a hydroxyl group and a carboxyl group, or a vinyl resin C including a block isocyanate group, a hydroxyl group, and a carboxyl group, and in which the content of the isocyanate group is from 0.4 mmol/g to 1.4 mmol/g, and a functional group molar ratio of [NCO/(COOH+OH)], which is obtained by dividing the content of the isocyanate group by the total sum content of the hydroxyl group and the carboxyl group, is from 0.5 to 1.2.

The powder coating material according to the exemplary embodiment maybe any of a transparent powder coating material (clear coating material) which does not contain a colorant in the powder particles, and a colored powder coating material which contains a colorant in the powder particles.

In addition, "a mixture of the vinyl resin A including the block isocyanate group and the carboxyl group with the vinyl resin B including the hydroxyl group and the carboxyl group, or the vinyl resin C including the block isocyanate group, the hydroxyl group, and the carboxyl group" is not limited to these two forms, for example, the former form includes a case in which a mixture is obtained by mixing the vinyl resin C in addition to the vinyl resin A and the vinyl resin B, and the latter form includes a case in which a mixture is obtained by mixing the vinyl resin C with at least one of the vinyl resin A and the vinyl resin B.

The powder coating material according to the exemplary embodiment may obtain a coating film which is excellent in solvent resistance and bending resistance as above-described configuration.

The reason for this is not clear, but is considered to be as follows.

The powder coating material using a vinyl resin such as an acrylic resin as a thermosetting resin may form the coating film excellent in the solvent resistance by forming a crosslinked structure through the thermosetting reaction. However, in accordance with a functional group which is used in the crosslinking reaction, for example, a ratio of a block isocyanate group and a hydroxyl group, the crosslinked structure is not easily formed through thermosetting reaction, and thus the solvent resistance of the coating film may be deteriorated, and cracks may occur when the coating film is bent.

On the other hand, a method of using a vinyl resin including a carboxyl group for the powder coating material as the thermosetting resin has been proposed. Here, since the thermosetting reaction may occur between the carboxyl group, which is included in the vinyl resin, and a block isocyanate group or the like, it is necessary to sufficiently consider the ratio of functional groups used to the thermosetting reaction in the powder coating material using the vinyl resin including carboxyl group.

The powder coating material according to the exemplary embodiment, as powder particles, contains the mixture of the vinyl resin A including the block isocyanate group and the carboxyl group with the vinyl resin B including the hydroxyl group and the carboxyl group, or the vinyl resin C including the block isocyanate group, the hydroxyl group, and the carboxyl group, and in which the content of the isocyanate group is from 0.4 mmol/g to 1.4 mmol/g, and a functional group molar ratio [NCO/(COOH+OH)], which is obtained by dividing the content of the isocyanate group by the total sum content of the hydroxyl group and the carboxyl group, is from 0.5 to 1.2.

First, in the powder coating material according to the exemplary embodiment, the powder particles contain the mixture of the vinyl resin A including the block isocyanate group and the carboxyl group with the vinyl resin B including the hydroxyl group and the carboxyl group, or the vinyl resin C including the block isocyanate group, the hydroxyl group, and the carboxyl group. In other words, in the powder coating material according to the exemplary embodiment, the thermosetting reaction occurs between the vinyl resin A and the vinyl resin B, and the thermosetting reaction occurs between the vinyl resins C.

When, in the powder particles, the content of the isocyanate group and a functional group molar ratio of [NCO/(COOH+OH)], which is obtained by dividing the content of the isocyanate group by the total sum content of the hydroxyl group and the carboxyl group are set to be within the aforementioned range, the reaction between the block isocyanate group and the carboxyl group, and the reaction between the block isocyanate group and the hydroxyl group are balanced with each other. As a result, it is assumed that the coating film excellent in solvent resistance and bending resistance may be obtained.

Additionally, in the powder coating material according to the exemplary embodiment, it is considered that with the powder particles including the above-described resin, the powder particles are not easily aggregated to each other, which means, blocking resistance is satisfactory.

Hereinafter, the powder coating material according to the exemplary embodiment will be described in detail.

The powder coating material according to the exemplary embodiment includes the powder particles.

The powder coating material may include an external additive which is attached onto the surface of the powder particles, in addition to the powder particles, if necessary, in order to improve fluidity.

Powder Particles

The powder particles have a first form of containing the mixture of the vinyl resin A including the block isocyanate group and the carboxyl group with the vinyl resin B including the hydroxyl group and the carboxyl group, and a second form of containing the vinyl resin C including the block isocyanate group, the hydroxyl group, and the carboxyl group.

In the powder particles in both first form and the second form, the content of the isocyanate group is from 0.4 mmol/g to 1.4 mmol/g, and a functional group molar ratio [NCO/(COOH +OH)], which is obtained by dividing the content of the isocyanate group by the total sum content of the hydroxyl group and the carboxyl group (hereinafter, simply referred to as the functional group molar ratio of [NCO/(COOH+OH)]) is from 0.5 to 1.2.

In the present specification, those common to the first and second forms are simply described as powder particles.

The content of the isocyanate group in the powder particles is from 0.4 mmol/g to 1.4 mmol/g, and is preferably from 0.6 mmol/g to 1.4 mmol/g.

If the content of the isocyanate group in the powder particles is less than 0.4 mmol/g, the number of the crosslinked structures formed through the thermosetting reaction becomes less, and thus the solvent resistance of the coating film is deteriorated. In addition, when the content of the isocyanate group in the powder particles is greater than 1.4 mmol/g, it is difficult to synthesize the vinyl resin used to achieve the above content, and the bending resistance of the coating film is deteriorated.

In addition, the functional group molar ratio of [NCO/(COOH+OH)] in the powder particles is from 0.5 to 1.2, but is preferably from 0.8 to 1.0.

If the functional group molar ratio of [NCO/(COOH+ OH)] in the powder particles is less than 0.5, the hydroxyl group and the carboxyl group which are not used in the crosslinking reaction remains, and thus physical properties of the coating film are deteriorated, and the solvent resistance and the bending resistance of the coating film are deteriorated. In addition, if the functional group molar ratio of [NCO/(COOH +OH)] in the powder particles is greater than 1.4, the block isocyanate group which is not used in the crosslinking reaction remains, and thus physical properties of the coating film are deteriorated, and the solvent resistance and the bending resistance of the coating film are deteriorated.

Meanwhile, the functional group molar ratio of [NCO/(COOH+OH)] in the powder particles is calculated from the value obtained by measuring each of the content (mmol/g) of the isocyanate group, the hydroxyl group, and the carboxyl group in the powder particles.

Subsequently, a method of measuring the content (mmol/g) of the isocyanate group, the hydroxyl group, and the carboxyl group in a powder coating material (the powder particles) will be described.

First, a solvent-soluble component (mainly a resin component) is extracted from the powder coating material (the powder particles), and then is set to be a measurement sample.

More specifically, 50 ml of tetrahydrofuran is added to 10 g of the powder coating material (the powder particles), and the mixture is kept at room temperature for 5 hours and then separated by a centrifugal separator (for example, at 15,000 rpm for 10 minutes) so as to extract a supernatant. Then, the solvent in the supernatant is evaporated under reduced pressure at 30° C. or lower, and the obtained solid is set to be a measurement sample.

Measurement of content of hydroxyl group and carboxyl group

Regarding the measurement sample which is obtained as described above, first, an acid value and a hydroxyl group value thereof are measured.

Specifically, the acid value is measured by using a neutralization titration method disclosed in JIS K 0070:1992.

In addition, the hydroxyl group value is measured by using a neutralization titration method disclosed in the JIS K 0070:1992.

The acid value (mgKOH/g) and the hydroxyl group value (mgKOH/g) which are measured by using the above-described methods are converted into a unit (mmol/g) so as to calculate the content of hydroxyl group and carboxyl group.

Measurement of Content of Isocyanate Group

The content of the isocyanate group is measured by using the following methods.

(1) A measurement sample of which the content is about from 1.0 g to 2.0 g is weighted into an Erlenmeyer flask having a fitting opening.

(2) 25 ml of 0.5 mol/l of dibutylamine-monochlorobenzene solution is added into the above Erlenmeyer flask, ortho-dichlorobenzene and zeolite are put into the Erlenmeyer flask, and then a "fitting"-type Allihn condenser is mounted to the opening of the flask.

(3) The above Erlenmeyer flask is placed on a hot plate which has been prepared in advance, and is subjected to a reaction for 30 minutes after the solvent in the Erlenmeyer flask begins to boil.

(4) Then, the Erlenmeyer flask is detached from the hot plate, and is cooled to room temperature. Thereafter, from 20 ml to 30 ml of methanol is poured thereinto from the top of the fitting-type Allihn condenser so as to wash the inner wall portion of the condenser with the methanol.

(5) The fitting-type Allihn condenser is detached from the Erlenmeyer flask, and thereafter, 70 ml of tetrahydrofuran, 30 ml of t-butanol, and one drop of bromophenol blue indicator are added into the Erlenmeyer flask. Then, the content of the Erlenmeyer flask is subjected to back titration by using a 0.5 mol/l of hydrochloric acid standard solution. At this time, the amount of the hydrochloric acid standard solution required for the above sample titration is represented by A (ml).

(6) The above steps (1) to (4) are repeated in the same manner as described above except that heating is not conducted, to thereby obtain a blank sample. The blank sample is subjected to a titration procedure in the same manner as described in the above step (5). At this time, the amount of the hydrochloric acid standard solution required for the above blank sample titration is represented by B (ml).

(7) In the above titration, the point at which the color of the bromophenol blue indicator is changed from indigo into yellow is treated as the end point of the titration.

(8) The content of the isocyanate group [mmol/g] is calculated by using the following Equation (1).

$$(f \times (B-A) \times 0.5)/ S \qquad \text{Equation (1)}$$

(in the above equation (1), the respective symbols have the following meanings; A: amount (ml) 0.5 mol/l of the hydrochloric acid standard solution required for the titration of the blank sample; B: amount (ml) 0.5 mol/l of the hydrochloric acid standard solution required for the titration of the blank sample; f: factor of the hydrochloric acid standard solution of 0.5 mol/l; and S: amount (g) of the measurement sample.)

The content of the isocyanate group which is measured by using the above method is the total amount of a block isocyanate group and a deblocked isocyanate group.

Meanwhile, when preparing the powder coating material (the powder particles), since the isocyanate group which is formed by deblocking the block isocyanate group is reacted with water or the like and thus is not the isocyanate group any more, most of the isocyanate group in the powder coating material (the powder particles) which are measured in the above method are the block isocyanate groups.

Accordingly, it is assumed that the content of the isocyanate group which is measured in the above method is the content of the block isocyanate group in the powder coating material (the powder particles).

Subsequently, the vinyl resins A to C which are used in the first form and the second form in the powder particles will be described.

Here, in the present specification, the vinyl resin means a resin obtained by radically polymerizing a monomer including a vinyl group (hereinafter referred to as "vinyl monomer"). Examples of the vinyl monomer include a monomer including a vinyl group, a (meta)acryloyl group, a vinyl ether group, a vinyl ester group, and an allyl group.

Vinyl Resin A

The vinyl resin A includes the block isocyanate group and the carboxyl group in the molecule.

As the vinyl resin A, the vinyl resin including the block isocyanate group and the carboxyl group on the side chain is preferable, and since the amount of the introduction of the block isocyanate group and carboxyl group is easily adjusted, a vinyl resin that is obtained by copolymerizing a vinyl monomer including the block isocyanate group and a vinyl monomer including the carboxyl group, and other monomers if necessary, is preferable.

The vinyl monomer including the block isocyanate group is preferably to be the vinyl monomer including the block isocyanate group which may be deblocked by heating, specifically, examples thereof include 2-[(3,5-dimethyl pyrazolyl)carbonyl amino]ethyl methacrylate, 2-(1-methyl propylidene)aminooxycarbonyl amino]ethyl methacrylate, 2-[1', 1'-bis(ethoxycarbonyl)methyl carbonyl amino]ethyl methacrylate, 2-[(3,5-dimethyl pyrazolyl)carbonyl amino]ethyl acrylate, and 2-[(1-methyl propylidene)aminooxycarbonyl amino]ethyl acrylate.

Meanwhile, these monomers may be used alone or in combination of two or more types thereof.

Among these, from the viewpoint of the availability and compatibility with the vinyl monomer to be copolymerized, 2-[(1-methyl propylidene)aminooxycarbonyl amino]ethyl methacrylate (corresponding to Karenz MOI-BM), and 2-[1', 1'-bis(ethoxycarbonyl)methyl carbonyl amino]ethyl methacrylate are preferable.

Examples of the vinyl monomer having the carboxyl group include an $\alpha$, $\beta$-unsaturated carboxylic acid (for example, a (meth)acrylic acid, a crotonic acid, an itaconic acid, a maleic acid, and a fumaric acid); monoesters of various types of $\alpha\beta$-unsaturated carboxylic acids and monohydric alcohol with the carbon atoms of 1 to 18 (for example, monomethyl fumarate, monoethyl fumarate, monobutyl fumarate, monoisobutyl fumarate, mono tert-butyl fumarate, monohexyl fumarate, monooctyl fumarate, mono 2-ethylhexyl fumarate, monomethyl maleate, monoethyl maleate, monobutyl maleate, monoisobutyl maleate, mono tert-butyl maleate, monohexyl maleate, monooctyl maleate, mono 2-ethylhexyl maleate, monomethyl itaconate, monoethyl itaconate, monobutyl itaconate, monoisobutyl itaconate, monohexyl itaconate, monooctyl itaconate, and mono 2-ethylhexyl itaconate).

Note that, these monomers may be used alone or in combination of two or more types thereof.

Among these, from the viewpoint of the glass transition temperature (Tg) of the vinyl resin and compatibility with the vinyl monomer to be copolymerized, an acrylic acid and a methacrylic acid are preferable.

Other monomers which do not include a thermosetting reactive group are used as other monomers which are used to obtain the vinyl resin A.

Examples of other vinyl monomers include various types of $\alpha$-olefins (for example, ethylene, propylene, and butene-1); various types of halogenated olefins (for example, vinyl chloride and vinylidene chloride) except for fluoroolefin, various types of aromatic vinyl monomers (for example, styrene, $\alpha$-methyl styrene, and vinyl toluene); various types diesters of $\alpha,\beta$-unsaturated carboxylic acids and monohydric alcohol with the carbon atoms of 1 to 18 (for example, dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate); various types of monomers containing an acid anhydride group (for example, maleic anhydride, itaconic anhydride, citraconic anhydride, (meth)acrylic anhydride, and tetrahydrophthalic anhydride); various types of monomers containing a phosphoric ester group (for example, diethyl-2-(meth)acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate); various types of aliphatic vinyl carboxylate (for example, vinyl acetate, vinyl propionate, vinyl butyrate, vinyl isobutyrate, vinyl caproate, vinyl caprylate, vinyl caprate, vinyl laurate, a branched aliphatic vinyl carboxylate with the carbon atoms of 9 to 11, vinyl stearate or the like); and various types of vinyl esters of carboxylic acids having a cyclic structure (for example, cyclohexane vinyl carboxylate, methyl cyclohexane vinyl carboxylate, vinyl benzoate, and p-tert-butyl vinyl benzoate).

Further, examples of other monomers include (meth) acrylic acid alkyl ester (for example, (meth)acrylic acid methyl, (meth)acrylic acid ethyl, (meth)acrylic acid n-propyl, (meth)acrylic acid isopropyl, (meth)acrylic acid n-butyl, (meth)acrylic acid isobutyl, (meth)acrylic acid tert-butyl, (meth)acrylic acid n-hexyl, (meth)acrylic acid cyclohexyl, (meth)acrylic acid 2-ethyl hexyl, (meth)acrylic acid n-octyl, (meth)acrylic acid isooctyl, (meth)acrylic acid 2-ethyl octyl, (meth)acrylic acid dodecyl, (meth)acrylic acid isodecyl, (meth)acrylic acid lauryl, (meth)acrylic acid stearyl); various types of (meth)acrylic acid aryl esters (for example, (meth)acrylic acid benzyl, (meth)acrylic acid phenyl, (meth) acrylic acid phenoxyethyl); various types of alkyl carbitol (meth)acrylates (for example, ethyl carbitol (meth)acrylate), other types of (meth)acrylic acid esters (for example, isobornyl (meth)acrylate, dicyclopentanyl (meth)acrylate, dicyclopentenyl(meth)acrylate, dicyclopentenyloxyethyl(meth) acrylate, and (meth)acrylic acid tetrahydrofurfuryl); various types of unsaturated amide monomers containing an amino group (for example, N-dimethyl aminoethyl(meth)acrylamide, N-diethyl aminoethyl(meth)acrylamide, N-dimethyl aminopropyl(meth)acrylamide, N-diethyl aminopropyl (meth)acrylamide); various types of dialkyl aminoalkyl (meth)acrylate (for example, dimethyl aminoethyl(meth) acrylate, and diethyl aminoethyl(meth)acrylate); various types of monomers containing an amino group (for example, tert-butyl aminoethyl(meth)acrylate, tert-butyl aminopropyl (meth)acrylate, aziridinyl ethyl (meth)acrylate, pyrrolidinyl ethyl(meth)acrylate, and piperidinyl ethyl(meth)acrylate).

Note that, these monomers may be used alone or in combination of two or more types thereof.

Among the above-described other monomers, from the viewpoint of the glass transition temperature (Tg) of the vinyl resin and compatibility with the vinyl monomer to be copolymerized, styrene, butyl methacrylate, butyl acrylate, methyl methacrylate, methyl acrylate are preferable.

The amount of introduction of the block isocyanate group and the carboxyl group in the vinyl resin A is adjusted by changing the type and copolymerization ratio of the monomer.

Vinyl Resin B

The vinyl resin B includes the hydroxyl group and the carboxyl group in the molecule.

As the vinyl resin B, the vinyl resin including the hydroxyl group and the carboxyl group on the side chain is preferable, and since the amount of the introduction of the hydroxyl group and the carboxyl group is easily adjusted, a vinyl resin that is obtained by copolymerizing the vinyl monomer including the hydroxyl group and the vinyl monomer including the carboxyl group, and other monomers if necessary, is preferable.

Examples of the vinyl monomer including the hydroxyl group include various types of hydroxyl group-containing (meth)acrylates (for example, 2-hydroxyethyl(meth)acrylate, 2-hydroxypropyl(meth)acrylate, 3-hydroxypropyl (meth)acrylate, 2-hydroxybutyl(meth)acrylate, 3-hydroxybutyl(meth)acrylate, 4-hydroxybutyl(meth)acrylate, polyethylene glycol mono(meth)acrylate, and polypropylene glycol mono(meth)acrylate), an addition reaction product of the various types of hydroxyl group-containing (meth) acrylates and ε-caprolactone, various types of hydroxyl group-containing vinyl ethers (for example, 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether), an addition reaction product of the various hydroxyl group-containing vinyl ethers and ε-caprolactone, various types of hydroxyl group-containing allyl ethers (for example, 2-hydroxyethyl (meth)allyl ether, 3-hydroxypropyl(meth)allyl ether, 2-hydroxypropyl(meth)allyl ether, 4-hydroxybutyl (meth)allyl ether, 3-hydroxybutyl(meth)allyl ether, 2-hydroxy-2-methylpropyl(meth)allyl ether, 5-hydroxypentyl (meth)allyl ether, and 6-hydroxyhexyl(meth)allyl ether), an addition reaction product of the various hydroxyl group-containing allyl ethers and ε-caprolactone, and the like.

Meanwhile, these monomers may be used alone or in combination of two or more types thereof.

Among these, from the viewpoint of the availability and compatibility with Tg of vinyl resin or the vinyl monomer to be copolymerized, hydroxyethyl methacrylate and hydroxyethyl acrylate are preferable.

Examples of a monomer including a carboxyl group include a monomer including the carboxyl group in the vinyl resin A, which is preferable.

Other monomers which do not include a thermosetting reactive group are preferable as other monomers which are used to obtain the vinyl resin B, and examples of these monomers include other monomers which do not include the thermosetting reactive group in the vinyl resin A, which are preferable.

The amount of introduction of the hydroxyl group and the carboxyl group in the vinyl resin B is adjusted by changing the type and copolymerization ratio of the monomer.

Vinyl Resin C

The vinyl resin C includes the block isocyanate group, the hydroxyl group, and the carboxyl group in a molecule.

As the vinyl resin C, a vinyl resin including the block isocyanate group, the hydroxyl group, and the carboxyl group on the side chain is preferable, and since the amount of the introduction of these three groups is easily adjusted, a vinyl resin that is obtained by copolymerizing the vinyl monomer including the block isocyanate group, the hydroxyl group, the vinyl monomer including the carboxyl group, and other monomers if necessary, is preferable.

Examples of the monomer including the block isocyanate group include a monomer including the carboxyl group in the vinyl resin A, which is preferable.

In addition, examples of the monomer including the hydroxyl group include a monomer including the hydroxyl group in the vinyl resin B, which is preferable.

Further, examples of the monomer including the carboxyl group include a monomer including the carboxyl group in the vinyl resin A, which is preferable.

In addition, other monomers which do not include a thermosetting reactive group are preferable as other monomers which are used to obtain the vinyl resin C, and examples of these monomers include other monomers which do not include the thermosetting reactive group in the vinyl resin A, which are preferable.

The amount of introduction of the block isocyanate group, the hydroxyl group, and the carboxyl group in the vinyl resin C is adjusted by changing the type and copolymerization ratio of the monomer.

The vinyl Resins A to C

The powder particles in the first form include the vinyl resin A and the vinyl resin B. Therefore, by adjusting the amount of introduction of each of the block isocyanate group and the carboxyl group in the vinyl resin A, the amount of introduction of each of the hydroxyl group and the carboxyl group in the vinyl resin B, and the mixing ratio of the vinyl resin A and the vinyl resin B, it is possible to control the content of the isocyanate group in the powder particles and the functional group molar ratio of [NCO/ (COOH+OH)] in the powder particles.

In addition, the powder particles in the second form includes the vinyl resin C. Since the vinyl resin C is a resin including three of the block isocyanate group, the hydroxyl group, and the carboxyl group at the same time, it is possible to control the content of the isocyanate group in the powder particles and the functional group molar ratio of [NCO/ (COOH +OH)] in the powder particles by adjusting the amount of introduction of each of the block isocyanate group, the hydroxyl group, and the carboxyl group in the vinyl resin C.

From the viewpoint of easily controlling the content of the isocyanate group and the functional group molar ratio of [NCO/(COOH+OH)] in the powder particles, the first form is preferable.

Note that, when the content of the isocyanate group in the powder particles, and the functional group molar ratio of [NCO/(COOH+OH)] in the powder particles are set to be within the aforementioned range, the vinyl resin C may be added to the powder particles in the first form, and reversely, one or both of the vinyl resins A and B may be added to the powder particles in the second form.

In addition, other thermosetting reactive groups such as an epoxy group, an amide group, and acid anhydride group may be introduced to the vinyl resins A to C, to the extent that the balance with the thermosetting reaction is not greatly lost.

The weight average molecular weight (Mw) of the vinyl resins A to C is, from the viewpoint of easily controlling of the molecular weight and the preparing of the powder coating material, preferably from 5,000 to 1,000,000, is more preferably from 10,000 to 500,000, and even more preferably from 10,000 to 200,000.

Particularly, when the weight average molecular weight (Mw) is from 20,000 to 100,000, the physical properties of the resin after being subjected to the thermosetting reaction is likely to be the properties suitable for the coating film, and thereby obtaining the coating film excellent in the solvent resistance and the bending resistance.

In the exemplary embodiment, the weight average molecular weight of the vinyl resins A to C is measured by using gel permeation chromatography (GPC). The molecular weight measurement by GPC is performed with a THF solvent using GPC.HLC-8120 GPC manufactured by Tosoh Corporation as a measurement device and column TSKgel Super HM-M (15 cm) manufactured by Tosoh Corporation. The weight average molecular weight and the number average molecular weight are calculated using a calibration curve of molecular weight created with a monodisperse polystyrene standard sample from results of this measurement.

The vinyl resins A to C may be synthesized by using a known radical-polymerizing reaction, an emulsion polymerization method may be used as in the description of a preparing method of the powder coating material described later.

Other Components

The powder particles may include other components in the first form and the second form.

Examples of other components thereof include a colorant, resins (hereinafter, referred to as "other resins") other than the vinyl resins A to C, a thermosetting agent, and other additives.

Colorant

As a colorant the colorant included in the powder particles, a pigment is used, for example. As the colorant, a pigment and a dye may be used in combination.

Examples of a pigment include an inorganic pigment such as iron oxide (for example, colcothar), titanium oxide, titanium yellow, zinc white, white lead, zinc sulfide, lithopone, antimony oxide, cobalt blue, and carbon black; an organic pigment such as quinacridone red, phthalocyanine blue, phthalocyanine green, permanent red, Hansa yellow, indanthrene Blue, Brilliant Fast Scarlet, and benzimidazolones yellow; and the like.

In addition, as the pigment, a brilliant pigment is also used. Examples of the photoluminescent pigment include metal powder such as a pearl pigment, aluminum powder, stainless steel powder; metallic flakes; glass beads; glass flakes; mica; and flake-shaped phosphorus iron oxide (MIO).

The colorant may be used alone or in combination of two or more types thereof.

The content of the colorant is selected in accordance with, for example, the types of pigments, and the color, brightness, and depth which are required to the coating film. For example, the content of the colorant is preferably from 1% by weight to 70% by weight, and more preferably from 2% by weight to 60% by weight, with respect to the entire resins contained in the powder particles.

Other Resins

In addition to the vinyl resins A to C, the powder particles may include resins (other resins) other than the vinyl resins A to C in the first form and the second form to the extent that the balance with the thermosetting reaction is not greatly lost.

Other resins are known resins which are used in the powder coating material, and examples thereof include a thermosetting resin (a resin including the thermosetting reactive group) other than the vinyl resins A to C, or a resin which does not include the thermosetting properties.

In order to obtain the coating film excellent in the solvent resistance and the bending resistance, the content of other resins is preferably equal to or less than 5% by weight with respect to the entire resins of the powder particles.

Thermosetting Agent

The powder particles may include the thermosetting agent in the first form and the second form to the extent that the balance with the thermosetting reaction is not greatly lost.

The thermosetting agent may be selected in accordance with the types of the block isocyanate group, the hydroxyl group, and the carboxyl group which are included in the vinyl resins A to C, or may be selected in accordance with the types of the thermosetting reactive groups of other resins which are used in combination.

In order to obtain the coating film excellent in the solvent resistance and the bending resistance, the content of the thermosetting agent is preferably equal to or less than 10% by weight with respect to the entire resins of the powder particles.

Other Additives

As the other additives, various additives used in the powder coating material are used.

Specific examples of the other additive include a surface adjusting agent (silicone oil or acrylic oligomer), a foam inhibitor (for example, benzoin or benzoin derivatives), a hardening accelerator (an amine compound, an imidazole compound, or a cationic polymerization catalyst), a plasticizer, a charge-controlling agent, an antioxidant, a pigment dispersant, a flame retardant, a fluidity-imparting agent, and the like.

Features of Powder Particle

Since the powder particles in the first form and the second form increase the storage properties of the powder coating material, that is, prevents the powder particles from being aggregated (blocking) to each other, the volume average particle diameter distribution index GSDv is preferably equal to or less than 1.50, and more preferably equal to or less than 1.42.

In addition, in order to form a coating film having excellent smoothness, the volume average particle diameter D50v of the powder particles is preferably from 1 μm to 25 μm, is more preferably from 2 μm to 20 μm, and is even more preferably from 3 μm to 15 μm.

Here, the volume average particle diameter D50v and the volume average particle diameter distribution index GSDv of the powder particles are measured using a Multisizer II (manufactured by Beckman Coulter, Inc.) and ISOTON-II (manufactured by Beckman Coulter, Inc.) as an electrolyte.

In the measurement, from 0.5 mg to 50 mg of a measurement sample is added to 2 ml of a 5% aqueous solution of surfactant (preferably sodium alkylbenzene sulfonate) as a dispersant. The obtained material is added to from 100 ml to 150 ml of the electrolyte.

The electrolyte in which the sample is suspended is subjected to a dispersion treatment using an ultrasonic disperser for 1 minute, and a particle diameter distribution of particles having a particle diameter from 2 μm to 60 μm is measured by a Coulter Multisizer II using an aperture having an aperture diameter of 100 μm. Moreover, 50,000 particles are sampled.

Cumulative distributions by volume are drawn from the side of the smallest diameter with respect to particle diameter ranges (channels) separated based on the measured particle diameter distribution. The particle diameter when the cumulative percentage becomes 16% is defined as a volume average particle diameter D16v, while the particle diameter when the cumulative percentage becomes 50% is defined as a volume average particle diameter D50v. Furthermore, the particle diameter when the cumulative percentage becomes 84% is defined as a volume average particle diameter D84v.

Furthermore, the volume average particle diameter distribution index (GSDv) is calculated as $(D84v/D16v)^{1/2}$.

Form of Powder Particle

The form of the powder particle may be a particle having a single layer structure in the first form and the second form, and may be a particle having a so-called core/shell structure which is formed of a core and a resin coating portion coating the core.

Hereinafter, a case in which the powder particle has the core/shell structure will be described.

Core

It is preferable that the core includes the vinyl resin A and the vinyl resin B in the first form, and includes the vinyl resin C in the second form, and if necessary, includes the colorant, other additives, or the like in each embodiment.

Here, the respective components forming the core are the components described above.

Resin Coating Portion

The resin coating portion may include the resin, is preferable to include the thermosetting resin, and is particularly preferable to include the vinyl resin A and the vinyl resin B in the first form, and the vinyl resin C in second form. The resin coating portion maybe formed of only the resin or may include other additives (other additives, or the like).

Here, since a phenomenon (so called, "bleed") in which inclusions (other additives added if necessary, such as a colorant, or a leveling agent) in the powder particles are deposited is reduced, the resin coating portion is preferably formed of only the resin. In addition, even when the resin coating portion includes other additives, the resin is preferably equal to or greater than 90% by weight (preferably, equal to or greater than 95% by weight) with respect to the entire resin coating portion.

Further, the vinyl resins A to C are preferably used as the resin of the resin coating portion, but resins other than the vinyl resins A to C may be used in combination to the extent that the curing density (crosslinking density) of the coating film is not deteriorated.

A coverage of the resin coating portion is preferably from 30% to 100% and more preferably from 50% to 100%, in order to prevent bleeding.

The coverage of the resin coating portion is the value measured by the following method.

The coverage of the resin coating portion with respect to the surface of the powder particle is a value acquired by X-ray photoelectron spectroscopy (XPS) measurement.

Specifically, in the XPS measurement, JPS-9000MX manufactured by JEOL Ltd. is used as a measurement device, and the measurement is performed by using an MgKα ray as the X-ray source and setting an accelerating voltage to 10 kV and an emission current to 30 mA.

The coverage of the resin coating portion with respect to the surface of the powder particles is determined by peak separation of a component derived from the material of the core on the surface of the powder particles and a component derived from a material of the resin coating portion, from the spectrum obtained under the conditions described above. In the peak separation, the measured spectrum is separated into each component using curve fitting by the least square method.

As the component spectrum to be a separation base, the spectrum obtained by singly measuring the vinyl resins A to C, other resins, a colorant (a pigment), other additives, used in preparation of the powder particles is used. In addition, the coverage is acquired from a ratio of a spectral intensity derived from the coating resin with respect to the total of entire spectral intensity obtained from the powder particles.

The thickness of the resin coating portion is preferably from 0.2 μm to 4 μm and more preferably from 0.3 μm to 3 μm, in order to prevent bleeding.

The thickness of the resin coating portion is a value obtained by the following method.

The powder particle is embedded in the epoxy resin, and a sliced piece is prepared by performing cutting with a diamond knife. This sliced piece is observed using a transmission electron microscope (TEM) and plural of images of the cross section of the powder particles are imaged. The thicknesses of 20 portions of the resin coating portion are measured from the images of the cross section of the powder particle, and an average value thereof is used.

When it is difficult to observe the resin coating portion in the image of the cross section due to a clear powder coating material, it is possible to easily perform the measurement by performing dyeing and observation.

Metal Ion

The powder particles preferably contain di- or higher-valent metal ions (hereinafter, simply referred to as "metal ions") in both of the first form and the second form. The metal ions are components contained in both of the core and the resin coating portion if the powder particle has the core/shell structure. When di- or higher-valent metal ions are contained in the powder particle, ion crosslinking is formed in the powder particle by the metal ions.

For example, the vinyl resins A to C include a carboxyl group or a hydroxyl group, and thus the carboxyl group or the hydroxyl group interacts with the metal ions and the ion crosslinking is formed. With this ion crosslinking, the bleeding of the powder particles is prevented from occurring, and the powder particles are prevented from being aggregated (blocking) to each other and the storage property is easily improved. In addition, after coating with the powder coating material, the bond of the ion crosslinking is broken due to heating at the time of thermal curing, and accordingly, the melt viscosity of the powder particles decreases and a coating film having excellent smoothness is easily formed.

Examples of the metal ions include divalent to tetravalent metal ions. Specifically, as the metal ions, at least one type of metal ion selected from the group consisting of aluminum ions, magnesium ions, iron ions, zinc ions, and calcium ions is used.

As a supply source of the metal ion (compound added to the powder particles as an additive), metal salt, an inorganic metal salt polymer, a metal complex, and the like are used, for example. For example, when preparing the powder particles by an aggregation and coalescence method, the metal salt and the inorganic metal salt polymer are added to the powder particles as an aggregating agent.

Examples of the metal salt include aluminum sulfate, aluminum chloride, magnesium chloride, magnesium sulfate, Iron (II) chloride, zinc chloride, calcium chloride, calcium sulfate, and the like.

Examples of the inorganic metal salt polymer include polyaluminum chloride, polyaluminum hydroxide, iron (II) polysulfate, calcium polysulfide, and the like.

Examples of the metal complex include metal salt of an aminocarboxylic acid and the like. Specific examples of the metal complex include metal salt (for example, calcium salt, magnesium salt, iron salt, and aluminum salt) using a well known chelate as a base such as ethylenediamine tetraacetic acid, propanediamine tetraacetic acid, nitrilotriacetic acid, triethylenetetramine hexaacetic acid, diethylenetriamine pentacetic acid, and the like.

Such a supply source of the metal ions may not be used as an aggregating agent, but maybe added simply as an additive.

As the valence of the metal ions is high, mesh ion crosslinking is easily formed, and it is preferable from the viewpoints of smoothness of the coating film and the storage properties of the powder coating material. Accordingly, the metal ions are preferably Al ions. That is, the supply source of the metal ions is preferably aluminum salt (for example, aluminum sulfate or aluminum chloride), or an aluminum salt polymer (for example, polyaluminum chloride or polyaluminum hydroxide). Among the supply sources of the metal ions, the inorganic metal salt polymer is preferable, compared to the metal salt, even though the valences of the metal ions thereof are the same as each other, from the viewpoints of smoothness of the coating film and the storage properties of the powder coating material. Accordingly, the supply source of the metal ions is particularly preferably an aluminum salt polymer (for example, polyaluminum chloride or polyaluminum hydroxide).

The content of the metal ions is preferably 0.002% by weight to 0.2% by weight and more preferably 0.005% by weight to 0.15% by weight, with respect to the entire powder particles, from the viewpoints of smoothness of the coating film and preventing the powder particles from being aggregated (blocking) to each other.

When the content of the metal ions is equal to or greater than 0.002% by weight, suitable ion crosslinking is formed by the metal ions, bleeding of the powder particles is prevented from being blocked and the storage properties of the powder coating material are easily improved. Meanwhile, when the content of the metal ions is equal to or smaller than 0.2% by weight, the formation of excessive ion crosslinking by the metal ions is prevented, and the smoothness of the coating film is easily improved.

Herein, when preparing the powder particles by an aggregation and coalescence method, the supply source of the metal ions added as an aggregating agent (metal salt or metal salt polymer) contributes to controlling the particle diameter distribution and shapes of the powder particles.

Specifically, high valence of the metal ions is preferable, in order to obtain a narrow particle diameter distribution. In addition, in order to obtain a narrow particle diameter distribution, the metal salt polymer is preferable, compared to the metal salt, even though the valences of the metal ions thereof are the same as each other. Accordingly, from the viewpoints described above, the supply source of the metal ions is preferably aluminum salt (for example, aluminum sulfate or aluminum chloride) and an aluminum salt polymer (for example, polyaluminum chloride or polyaluminum hydroxide), and particularly preferably an aluminum salt polymer (for example, polyaluminum chloride or polyaluminum hydroxide).

When the aggregating agent is added so that the content of the metal ions is equal to or greater than 0.002% by weight, aggregation of the resin particles in the aqueous medium proceeds, and this contributes to realization of the narrow particle diameter distribution. The aggregation of the resin particles to be the resin coating portion proceeds with respect to the aggregated particles to be the core, and this contributes to realization of the formation of the resin coating portion with respect to the entire surface of the core. Meanwhile, when the aggregating agent is added so that the content of the metal ions is equal to or smaller than 0.2% by weight, the formation of excessive creating of ion crosslinking in the aggregated particles is prevented, and the shape of the powder particles formed by coalescence is easily set to be close to a sphere. Accordingly, from the viewpoints described above, the content of the metal ions is preferably from 0.002% by weight to 0.2% by weight and more preferably from 0.005% by weight to 0.15% by weight.

The content of the metal ions is measured by quantitative analysis of fluorescent X-ray intensity of the powder particles. Specifically, for example, first the resin and the supply source of the metal ions are mixed with each other, and a resin mixture having a well-known concentration of the metal ions is obtained. A pellet sample is obtained with 200 mg of this resin mixture by using a tableting tool having a diameter of 13 mm. The weight of this pellet sample is precisely weighed, and the fluorescent X-ray intensity of the pellet sample is measured to obtain peak intensity. In the same manner as described above, the measurement is performed for the pellet sample with the changed added amount of the supply source of the metal ions, and a calibration curve is created with the results. The quantitative analysis of the content of the metal ions in the powder particle to be a measurement target is performed by using this calibration curve.

Examples of an adjusting method of the content of the metal ions include 1) a method of adjusting the added amount of the supply source of the metal ions, 2) in a case of preparing the powder particles by an aggregation and coalescence method, a method of adjusting the content of the metal ions by adding the aggregating agent (for example, metal salt or the metal salt polymer) as the supply source of the metal ions in an aggregation step, adding a chelating agent (for example, ethylenediamine tetraacetic acid (EDTA), diethylenetriamine pentacetic acid (DTPA), or nitrilotriacetic acid (NTA)) at a last stage of the aggregation step, forming the metal ions and a complex by the chelating agent, and removing the formed complex salt in a washing step.

External Additive

Since the external additive prevents the powder particles attached on the surface from being aggregated to each other, the coating film having the excellent smoothness with a small amount is formed.

Specific examples of the external additive include inorganic particles. Examples of the inorganic particles include particles of $SiO_2$, $TiO_2$, $Al_2O_3$, $CuO$, $ZnO$, $SnO_2$, $CeO_2$, $Fe_2O_3$, $MgO$, $BaO$, $CaO$, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$.

Surfaces of the inorganic particles as an external additive are preferably subjected to a hydrophobizing treatment. The hydrophobizing treatment is performed by, for example, dipping the inorganic particles in a hydrophobizing agent. The hydrophobizing agent is not particularly limited and examples thereof include a silane coupling agent, silicone oil, a titanate coupling agent, and an aluminum coupling agent. These may be used alone or in combination of two or more types thereof.

Generally, the amount of the hydrophobizing agent is, for example, from 1 part by weight to 10 parts by weight with respect to 100 parts by weight of the inorganic particles.

The amount of the external additive externally added is, for example, preferably from 0.01% by weight to 5% by weight and more preferably from 0.01% by weight to 2.0% by weight, with respect to the powder particles.

Preparing Method of Powder Coating Material

Next, a method of preparing the powder coating material according to the exemplary embodiment will be described.

After preparing the powder particles, the powder coating material according to the exemplary embodiment is obtained by externally adding the external additives to the powder particles, if necessary.

The powder particles may be prepared using any of a dry preparing method (e.g., kneading and pulverizing method) and a wet preparing method (e.g., aggregation and coalescence method, suspension and polymerization method, and dissolution and suspension method). The method of preparing powder particles is not particularly limited to these preparing methods, and a known preparing method is employed.

Among these, from the viewpoint that the vinyl resins A to C having the carboxyl group are preferably used, and the volume average particle diameter distribution index GSDv, and the volume average particle diameter D50v may be easily controlled to be within the above-described range, it is preferable that the powder particles are obtained through an aggregation and coalescence method.

Specifically, it is preferable that the powder particles in the first form are obtained by aggregating at least resin particles which include the vinyl resin A and are dispersed in a dispersion, and resin particles which include the vinyl resin B and are dispersed in the dispersion to form aggregated particles, and coalescing the aggregated particles by heating, and the powder particles in the second form are obtained by aggregating at least resin particles which include the vinyl resin C and are dispersed in a dispersion to form aggregated particles, and coalescing the aggregated particles by heating.

That is, it is preferable that the powder particles are obtained through a step of preparing a dispersion including at least the resin particles including the vinyl resin A and the resin particles including the vinyl resin B, or a dispersion including at least the resin particles including the vinyl resin C, step of forming aggregated particles obtained by aggregating the resin particles in the dispersion, and a step of coalescing the aggregated particles (a preparing method of the powder coating material in the exemplary embodiment).

In addition, when the powder particles have the core/shell structure, the following method is preferably used.

That is, in the first form, the powder particles are preferably prepared by the following steps; (1) a step of forming first aggregated particles by aggregating the resin particles A and the resin particles B in the dispersion in which the resin particles A including the vinyl resin A and the resin particles B including the vinyl resin B are dispersed, or by aggregating composite particles in the dispersion in which composite particles including the vinyl resin A and the vinyl resin B are dispersed, (2) a step of forming second aggregated particles by mixing a first aggregated particle dispersion in which the first aggregated particles are dispersed, a dispersion in which the resin particles A including the vinyl resin A and the resin particles B including the vinyl resin B are dispersed, or a dispersion in which composite particles including the vinyl resin A and the vinyl resin B are dispersed, by aggregating the resin particles A and the resin particles B, or the composite particles on the surface of the first aggregated particles, and attaching the resin particles A and the resin particles B, or the composite particles on the surface of the first aggregated particles, and a step of heating the second aggregated particle dispersion in which the second aggregated particles are dispersed so as to coalesce the second aggregated particles.

In addition, in the second form, the powder particles are preferably prepared by the following steps; (1) a step of forming the first aggregated particles by aggregating the resin particles C in the dispersion in which the resin particles C including the vinyl resin C are dispersed, (2) a step of forming the second aggregated particles by mixing a first aggregated particle dispersion in which the first aggregated particles are dispersed and the dispersion in which the resin particles C including the vinyl resin C are dispersed, aggregating the resin particle C on the surface of the first aggregated particles, and attaching the resin particles C on the surface of the first aggregated particles, and a step of coalescing the second aggregated particles by heating a second aggregated particle dispersion in which the second aggregated particles are dispersed.

The powder particles prepared by this aggregation and coalescence method are particles having a core/shell structure in which a coalesced portion of the first aggregated particles is the core, and the coalesced portion of the resin particle or the composite particles attached onto the surface of the first aggregated particles is the resin coating portion.

Meanwhile, with the particles having the core/shell structure, there is an advantage of easily preventing the bleeding of the colorant included in the core or other additives by coating the core in the resin coating portion even when the core contains other additives such as a colorant, or a leveling agent.

Hereinafter, the respective steps will be described in detail.

Meanwhile, in the following description, a method of preparing the powder particles, which are the powder particles in the first form, by using the colorant is described. Note that, the colorant is included if necessary.

Dispersion Preparation Step

First, the dispersion used in the aggregation and coalescence method is prepared.

Specifically, resin particle dispersion in which the resin particles A including the vinyl resin A for the core and resin coating portion are dispersed, resin particle dispersion in which the resin particles B including the vinyl resin B for the core and resin coating portion are dispersed, and colorant dispersion in which colorants are dispersed, are prepared.

In addition, in an example of using the composite particles, composite particle dispersion in which composite particles including the vinyl resin A and the vinyl resin B for the core and resin coating portion are dispersed is prepared instead of the resin particle dispersion in which the resin particles A including the vinyl resin A for the core and resin coating portion are dispersed, and the resin particle dispersion in which the resin particles B including the vinyl resin B for the core and resin coating portion are dispersed.

Various types of the resin particles and the composite particles used in the powder coating material preparation step, are collectively described as the "resin particles" and the dispersion of the resin particle are described as "resin particle dispersion".

Herein, resin particle dispersion is, for example, prepared by dispersion the resin particles in a dispersion medium with a surfactant.

An aqueous medium is used, for example, as the dispersion medium used in the resin particle dispersion.

Examples of the aqueous medium include water such as distilled water, ion exchange water, or the like, alcohols, and the like. The medium may be used alone or in combination of two or more types.

Examples of the surfactant include anionic surfactants such as sulfuric ester salt, sulfonate, phosphate ester, and soap anionic surfactants; cationic surfactants such as amine salt and quaternary ammonium salt cationic surfactants; and nonionic surfactants such as polyethylene glycol, alkyl phenol ethylene oxide adduct, and polyol nonionic surfactants. Among these, anionic surfactants and cationic surfactants are particularly used. Nonionic surfactants may be used in combination with anionic surfactants or cationic surfactants.

The surfactants may be used alone or in combination of two or more types thereof.

Regarding the resin particle dispersion, as a method of dispersion the resin particles in the dispersion medium, a common dispersion method using, for example, a rotary shearing-type homogenizer, or a ball mill with media, a sand mill, or a dyno mill is exemplified. Depending on the type of the resin particles, the resin particles may be dispersed in the resin particle dispersion using, for example, a phase inversion emulsification method.

The phase inversion emulsification method includes: dissolving a resin to be dispersed in a hydrophobic organic solvent in which the resin is soluble; conducting neutralization by adding abase to an organic continuous phase (O phase); and converting the resin (so-called phase inversion) from W/O to O/W by adding an aqueous medium (W phase) to form a discontinuous phase, thereby dispersion the resin as particles in the aqueous medium.

As the preparing method of the resin particle dispersion, specifically, the following method which is performed by using the emulsion polymerization method is employed.

For example, the emulsion polymerization method is performed by emulsifying a raw material monomer in an aqueous medium, adding a water-soluble initiator (for example, potassium persulfate), or if necessary, a chain transfer agent for controlling the molecular weight (for example, dodecanthiol), and then heating the resultant through the emulsion polymerization method.

Meanwhile, when the resin particle dispersion is the composite particle dispersion, the vinyl resin A and the vinyl resin B are mixed with each other, and are dispersed (for example, subjected to emulsification such as phase inversion emulsification) in a dispersion medium, and accordingly the composite particle dispersion is obtained.

The volume average particle diameter of the resin particles dispersed in the resin particle dispersion is, for example, preferably equal to or smaller than 1 μm, more preferably from 0.01 μm to 1 μm, even more preferably from 0.08 μm to 0.8 μm, and still more preferably from 0.1 μm to 0.6 μm.

Regarding the volume average particle diameter of the resin particles, a cumulative distribution by volume is drawn from the side of the smallest diameter with respect to particle diameter ranges (channels) separated using the particle diameter distribution obtained by the measurement of a laser diffraction-type particle diameter distribution measuring device (for example, manufactured by Horiba, Ltd., LA-700), and a particle diameter when the cumulative percentage becomes 50% with respect to the entire particles is measured as a volume average particle diameter D50v. The volume average particle diameter of the particles in other dispersions is also measured in the same manner.

The content of the resin particles contained in the resin particle dispersion is, for example, preferably from 5% by weight to 50% by weight, and more preferably from 10% by weight to 40% by weight.

For example, the colorant dispersion are also prepared in the same manner as in the case of the resin particle dispersion. That is, the resin particles in the resin particle dispersion are the same as the particles of the colorant dispersed in the colorant dispersion, in terms of the volume average particle diameter, the dispersion medium, the dispersion method, and the content of the particles.

First Aggregated Particle Forming Step

Next, the resin particle dispersion in which the resin particles A including the vinyl resin A for the core are dispersed, the resin particle dispersion in which the resin particles B including the vinyl resin B for the core are dispersed, and the colorant dispersion are mixed with each other.

The resin particles A, the resin particles B, and the colorant are heterogeneously aggregated in the mixed dispersion, thereby forming first aggregated particles having a diameter similar to a target powder particle diameter and including the resin particles A, the resin particles B, and the colorant.

Specifically, for example, an aggregating agent is added to the mixed dispersion and a pH of the mixed dispersion is adjusted to be acidic (for example, the pH is from 2 to 5). If necessary, a dispersion stabilizer is added. Then, the mixed dispersion is heated at a temperature of a glass transition temperature that is equal to or lower than the first resin particles A and the second resin particles B (specifically, for example, from a temperature −30° C. of the glass transition temperature to −10° C. of the glass transition temperature of the resin particles A and the resin particles B to a temperature) to aggregate the particles dispersed in the mixed dispersion, thereby forming the first aggregated particles.

In the first aggregated particle forming step, the first aggregated particles may be formed by mixing the composite particle dispersion including the vinyl resin A and the vinyl resin B with the colorant dispersion, and heterogeneously aggregating the composite particle and the colorant in the mixed dispersion.

In the first aggregated particle forming step, for example, the aggregating agent maybe added at room temperature (for example, 25° C.) while stirring of the mixed dispersion using a rotary shearing-type homogenizer, the pH of the mixed dispersion may be adjusted to be acidic (for example, the pH is from 2 to 5), a dispersion stabilizer may be added if necessary, and the heating may then be performed.

Examples of the aggregating agent include a surfactant having an opposite polarity to the polarity of the surfactant used as the dispersion to be added to the mixed dispersion, metal salt, a metal salt polymer, and a metal complex. When a metal complex is used as the aggregating agent, the amount of the surfactant used is reduced and charging characteristics are improved.

After completing the aggregation, an additive for forming a bond of metal ions of the aggregating agent and a complex or a similar bond may be used, if necessary. A chelating agent is suitably used as this additive. With the addition of this chelating agent, the content of the metal ions of the powder particles may be adjusted when the aggregating agent is excessively added.

Herein, the metal salt, the metal salt polymer, or the metal complex as the aggregating agent is used as a supply source of the metal ions. These examples are as described above.

A water-soluble chelating agent is used as the chelating agent. Specific examples of the chelating agent include oxycarboxylic acids such as tartaric acid, citric acid, and gluconic acid, iminodiacetic acid (IDA), nitrilotriacetic acid (NTA), and ethylenediaminetetraacetic acid (EDTA).

The amount of the chelating agent added is, for example, preferably from 0.01 parts by weight to 5.0 parts by weight, and more preferably from 0.1 parts by weight to less than 3.0 parts by weight with respect to 100 parts by weight of the resin particles.

Second Aggregated Particle Forming Step

Next, the obtained first aggregated particle dispersion in which the first aggregated particles are dispersed is mixed together with the resin particle dispersion in which the resin particle A including the vinyl resin A for resin coating portion are dispersed, and the resin particle dispersion in which the resin particle B including the vinyl resin B for resin coating portion are dispersed.

Meanwhile, the vinyl resin A and the vinyl resin B for resin coating portion may be the same type as the vinyl resin A and the vinyl resin B for the core or maybe not.

The resin particles A and the resin particles B are aggregated to be attached onto the surface of the first aggregated particles in the mixed dispersion in which the first aggregated particles and the resin particles A and the resin particles B are dispersed, thereby forming second aggregated particles in which the resin particles A and the resin particles B are attached onto the surface of the first aggregated particles.

Specifically, in the first aggregated particle forming step, for example, when the particle diameter of the first aggregated particle reaches a target particle diameter, the resin particle dispersion in which the resin particles A including the vinyl resin A for the resin coating portion are dispersed and the resin particle dispersion in which the resin particles B including the vinyl resin B for the resin coating portion are dispersed are mixed with each other in the first aggregated particle dispersion, and this mixed dispersion is heated at a equal to or less than the glass transition temperature of the resin particles A and the resin particles B.

Then, a pH of the mixed dispersion is set to be within, for example, from 6.0 to 8.5 so as to stop the progress of the aggregation.

Accordingly, the second aggregated particles in which the resin particles A and the resin particles B are aggregated to be attached onto the surface of the first aggregated particles are obtained.

Meanwhile, in the second aggregated particle forming step, the second aggregated particles may be formed by mixing the first aggregated particle dispersion in which the first aggregated particles are dispersed, a composite particle dispersion including the vinyl resin A and the vinyl resin B for the resin coating portion, and attaching and aggregating the composite particles onto the surface of the first aggregated particles in the mixed dispersion.

In addition, here, an example of forming the resin coating portion by using both of the vinyl resin A and the vinyl resin B is described, but the resin coating portion may be formed by using one of the vinyl resin A and the vinyl resin B.

Coalescence Step

Next, the second aggregated particle dispersion in which the second aggregated particles are dispersed is heated at, for example, a temperature that is equal to or higher than the glass transition temperature of the first resin particles A and the second resin particles B(for example, a temperature that is higher than the glass transition temperature of the first resin particles A and second resin particles B by 10° C. to 30° C.) to coalesce the second aggregated particles and form the target powder particles.

Hereinbefore, the preparing method of the powder particles in the first form is described as an example, and the preparing method of the powder particles of the second form may be performed in the same way except that the preparing method of the powder particles in the first form is replaced with that in the following description.

In other words, in the respective steps of preparing the dispersion, the resin particle dispersion in which the resin particles C including the vinyl resin C for the core and the resin coating portion is dispersed is prepared instead of the resin particle dispersion in which the resin particles A including the vinyl resin A for the core and the resin coating portion is dispersed.

In the first aggregated particle forming step, the first aggregated particles are formed by using the resin particle dispersion in which the resin particles C including the vinyl resin C for the core are dispersed instead of the resin particle dispersion in which the resin particles A including the vinyl resin A for the core are dispersed, the resin particle dispersion in which the resin particles B including the vinyl resin B for the core are dispersed, or the composite particle dispersion including the vinyl resin A and the vinyl resin B.

In the second aggregated particle forming step, the second aggregated particles are formed by using the resin particle dispersion in which the resin particles C including the vinyl resin C for the resin coating portion are dispersed instead of the resin particle dispersion in which the resin particles A including the vinyl resin A for the resin coating portion are dispersed, the resin particle dispersion in which the resin particles B including the vinyl resin B for the resin coating portion are dispersed, or the composite particle dispersion including the vinyl resin A and the vinyl resin B for the resin coating portion.

Subsequent Step

Herein, after the coalescence step ends, the powder particles formed in the dispersion are subjected to a washing step, a solid-liquid separation step, and a drying step, that are well known, and thus dry powder particles are obtained.

In the washing step, preferably displacement washing using ion exchange water is sufficiently performed from the viewpoint of charging properties. In addition, the solid-liquid separation step is not particularly limited, but suction filtration, pressure filtration, or the like is preferably performed from the viewpoint of productivity. The method for the drying step is also not particularly limited, but freeze drying, airflow drying, fluidized drying, vibration-type fluidized drying, or the like is preferably performed from the viewpoint of productivity.

The powder coating material according to the exemplary embodiment is prepared by adding and mixing, for example, an external additive to the obtained dry powder particles, if necessary.

The mixing is preferably performed with, for example, a V-blender, a Henschel mixer, a Lodige mixer, or the like.

Furthermore, if necessary, coarse particles of the toner may be removed using a vibration sieving machine, a wind-power sieving machine, or the like.

Coated article and preparing method of coated article

A coated article according to the exemplary embodiment is a coated article having a coating film formed on the surface to be coated by the powder coating material according to the exemplary embodiment. As a method of preparing the coated article according to the exemplary embodiment, there is a method of preparing the coated article by coating with the powder coating material according to the exemplary embodiment.

Specifically, after coating a surface to be coated with the powder coating material, a coating film having the powder coating material cured by heating (burning) is formed, and accordingly the coated article is obtained.

In the coating with the powder coating material, a well-known coating method such as electrostatic powder coating, frictional charge powder coating, or fluidized dipping is used. The thickness of the coating film of the powder coating material is, for example, preferably from 30 µm to 50 µm.

A heating temperature (burning temperature) is, for example, preferably from 90° C. to 250° C., more preferably from 100° C. to 220° C., and even more preferably from 120° C. to 200° C. The heating time (burning time) is adjusted depending on the heating temperature (burning temperature).

The coating and the heating (burning) of the powder coating material may be simultaneously performed.

A target product to be coated with the powder coating material is not particularly limited, and various metal components, ceramic components, or resin components are used. These target products may be uncompleted products which are not yet molded to the products such as a plate-shaped product or a linear product, and may be molded products which are molded to be used in an electronic component, a road vehicle, or an interior and exterior material of a building. In addition, the target product may be a product including a surface to be coated which is subjected to a surface treatment such as a primer treatment, a plating treatment, or an electrodeposition coating, in advance.

EXAMPLES

Hereinafter, the exemplary embodiment will be described in detail using examples, but is not limited to these examples. In the following description, unless specifically noted, "parts" and "%" are based on the weight.

Preparation of Resin Particle Dispersion

Preparation of Resin Particle Dispersion A1

| | |
|---|---|
| Styrene (St) | 192.0 parts |
| n-butyl acrylate (BA) | 52.5 parts |
| Karenz MOI-BM (manufactured by SHOWA DENKO K.K.) | 51.0 parts |
| Acrylic acid (AA) | 4.5 parts |
| Dodecanthiol (DDT) | 1.8 parts |

A mixture is prepared by mixing the above described materials.

5 parts of a nonionic surfactant (Noigen EA-157 manufactured by Daiichi Kogyo Seiyaku Co., Ltd.) and 6 parts of an anionic surfactant (NEOGEN SC manufactured by Daiichi Kogyo Seiyaku Co., Ltd.) are dissolved in 516 parts of ion exchange water in a flask, 30 parts of ion exchange water in which 2.6 parts of potassium persulfate is dissolved is charged into the flask, nitrogen substitution is performed, the contents in the flask is heated to 50° C. while stirring, and then the above-prepared mixture is added into the flask over 90 minutes. After adding the mixture, emulsion polymerization is continuously performed for 5 hours. In this way, the resin particle dispersion A1 (solid content 35%), in which the resin particles A1 formed with the vinyl resin are dispersed, is prepared.

Preparation of Resin Particle Dispersions A2 to A5

Resin particle dispersion A2 to A5 (solid content 35%), in which the resin particles A2 to A5 are dispersed, respectively, are obtained through the same method in the preparation of the resin particle dispersion A1 except that an amount of the respective materials used in the above is changed as shown in Table 1 below.

Preparation of Resin Particle Dispersion B1

| | |
|---|---|
| Styrene (St) | 193.5 parts |
| n-butyl acrylate (BA) | 70.5 parts |
| Hydroxyethyl acrylate (HEMA) | 31.5 parts |
| Acrylic acid (AA) | 4.5 parts |
| Dodecanthiol (DDT) | 1.8 parts |

A mixture is prepared by mixing the above described materials.

5 parts of nonionic surfactants (NOIGEN EA-157 manufactured by Daiichi Kogyo Seiyaku Co., Ltd.) and 6 parts of anionic surfactants (NEOGEN SC manufactured by Daiichi Kogyo Seiyaku Co., Ltd.) are dissolved in 514 parts of ion exchange water in a flask, 30 parts of ion exchange water in which 2.6 parts of potassium persulfate is dissolved is charged into the flask, nitrogen substitution is performed, the contents in the flask are heated to 50° C. while stirring, and then the above mixture is added into the flask over 90 minutes. After adding the mixture, emulsion polymerization is continuously performed for 5 hours. In this way, the resin particle dispersion B1 (solid content 35%), in which the resin particles B1 formed with the vinyl resin are dispersed, is prepared.

Preparation of Resin Particle Dispersions B2 to B5

Resin particle dispersions B2 to B5 (solid content 35%), in which the resin particles B2 to B5 are dispersed, respectively, are obtained through the same method in the preparation of the resin particle dispersion B1 except that an amount of the respective materials used in the above is changed as shown in Table 1 below.

Preparation of Resin Particle Dispersion C3

| | |
|---|---|
| Styrene (St) | 149.3 parts |
| n-butyl acrylate (BA) | 65.3 parts |
| Karenz MOI-BM (manufactured by SHOWA DENKO K.K.) | 57.0 parts |
| Hydroxyethyl methacrylate (HEMA) | 24.0 parts |
| Acrylic acid (AA) | 4.5 parts |
| Dodecanthiol (DDT) | 1.5 parts |

A mixture is prepared by mixing the above described materials.

5 parts of nonionic surfactants (NOIGEN EA-157 manufactured by Daiichi Kogyo Seiyaku Co., Ltd.) and 6 parts of anionic surfactants (NEOGEN SC manufactured by Daiichi Kogyo Seiyaku Co., Ltd.) are dissolved in 514 parts of ion exchange water in a flask, 30 parts of ion exchange water in which 2.6 parts of potassium persulfate is dissolved is charged into the flask, nitrogen substitution is performed, the contents in the flask are heated to 50° C. while stirring, and then the above-prepared mixture is added into the flask over 90 minutes. After adding the mixture, emulsion polymerization is continuously performed for 5 hours. In this way, the resin particle dispersion C1 (solid content 35%), in which the resin particles C1 formed with the vinyl resin are dispersed, is prepared.

Physical properties of resin particles in resin particle dispersion

The resin particles in the resin particle dispersion which is obtained as described above, the volume average particle diameter, and the weight average molecular weight (Mw) are measured by using the above-described method.

The results are shown in Table 1 below.

TABLE 1

| Resin particle | Types of monomers and chain transfer agents (parts) | | | | | | Physical properties | |
|---|---|---|---|---|---|---|---|---|
| | | | | | | | Volume average particle diameter | |
| NO. | BA | St | MOI-BM | HEMA | AA | DDT | (nm) | Mw |
| A1 | 52.5 | 192.0 | 51.0 | 0.0 | 4.5 | 1.8 | 155 | 58,000 |
| A2 | 49.8 | 187.2 | 58.5 | 0.0 | 4.5 | 1.8 | 145 | 65,000 |
| A3 | 38.7 | 125.1 | 131.7 | 0.0 | 4.5 | 1.8 | 140 | 70,000 |
| A4 | 28.5 | 106.2 | 160.8 | 0.0 | 4.5 | 1.8 | 180 | 63,000 |
| A5 | 49.5 | 198.6 | 59.4 | 0.0 | 4.5 | 7.2 | 150 | 20,000 |
| B1 | 70.5 | 193.5 | 0.0 | 31.5 | 4.5 | 1.8 | 150 | 65,000 |
| B2 | 70.5 | 154.5 | 0.0 | 70.5 | 4.5 | 1.8 | 160 | 63,000 |
| B3 | 70.5 | 135.0 | 0.0 | 90.0 | 4.5 | 1.8 | 145 | 49,000 |
| B4 | 70.5 | 106.8 | 0.0 | 118.2 | 4.5 | 1.8 | 145 | 68,000 |
| B5 | 70.5 | 193.2 | 0.0 | 31.8 | 4.5 | 7.2 | 140 | 20,000 |
| C1 | 65.3 | 149.3 | 57.0 | 24.0 | 4.5 | 1.5 | 145 | 72,000 |

Preparation of Colorant Dispersion
Preparation of Colorant Dispersion (Cyan)
Cyan pigment (C.I. Pigment Blue 15:3, (copper phthalocyanine) manufactured by Dainichiseika Color & Chemicals Mfg. Co., Ltd.): 100 parts by weight
Anionic surfactant (NEOGEN RK manufactured by Daiichi Kogyo Seiyaku Co., Ltd.): 15 parts by weight
Ion exchange water: 450 parts by weight The above-described materials are mixed, dissolved, and dispersed for 1 hour by using a high pressure impact-type disperser Ultimaizer (HJP 30006, manufactured by Sugino Machine Ltd.) so as to disperse a cyan pigment, thereby preparing a colorant dispersion (cyan).

The volume average particle diameter of the cyan pigment in the colorant dispersion is 0.13 μm, and the solid content ratio of the colorant dispersion is 25%.

Preparation of Colorant Dispersion (White)
Titanium oxide (A-220 manufactured by Ishihara Sangyo Kaisha Ltd.) : 100 parts by weight
Anionic surfactant (NEOGEN RK manufactured by Daiichi Kogyo Seiyaku Co., Ltd.): 15 parts by weight
Ion exchange water: 400 parts by weight The above described materials are mixed, dissolved, and dispersed for 3 hours by using a high pressure impact-type disperser Ultimaizer (HJP 30006, manufactured by Sugino Machine Ltd.) so as to disperse titanium oxide, thereby preparing a colorant dispersion (white).

The volume average particle diameter of the titanium oxide in the colorant dispersion which is measured by using a laser diffraction particle size analyzer is 0.25 μm, and the solid content ratio of the colorant dispersion is 25%.

Example 1

| | |
|---|---|
| Resin particle dispersion A2 | 143 parts (resin amount: 50 parts) |
| Resin particle dispersion B1 | 143 parts (resin amount: 50 parts) |
| Colorant dispersion (cyan) | 3.6 parts (colorant amount: 0.9 parts) |
| Colorant dispersion (white) | 100 parts (colorant amount: 25 parts) |
| Ion exchange water | 90 parts |

The respective dispersions and ion exchange water are sufficiently mixed and dispersed in a round-bottom stainless steel flask by using a homogenizer (ULTRA-TURRAX T50 manufactured by IKA Ltd.).

Then, a pH is adjusted to 2.5 with 1.0% aqueous nitric acid solution. 0.42 parts of 10% polyaluminum chloride aqueous solution is added into the flask and a dispersion operation is continuously performed with the homogenizer.

Thereafter, a stirring device and a mantle heater are installed in the round-bottom stainless steel flask, and a temperature in the flask is increased up to 48° C. while the rotation rate of the stirring device is properly adjusted so that slurries are sufficiently stirred. After leaving the resultant for 30 minutes as it is, the pH is adjusted to 6.0 with 5% of sodium hydroxide aqueous solution. Thereafter, the temperature is increased up to 80° C. and is kept for 1 hour.

After reaction is finished, the solution in the flask is cooled and filtered so as to obtain the solid content. Next, after this solid content is sufficiently cleaned with the ion exchange water, the solid-liquid separation is performed through the Nutsche-type suction filtration so as to obtain the solid content again.

Subsequently, this solid content is redispersed in 3 liters of the ion exchange water at 40° C., and then is washed by stirring the solid content at 300 rpm for 15minutes. This washing operation is repeatedly performed 5 times, and the solid content obtained through the solid-liquid separation by using the Nutsche-type suction filtration is vacuum dried for 12 hours.

0.5 parts by weight of hydrophobic silica particles (16 nm of primary particle diameter) are mixed, as as external additive, with respect to 100 parts by weight of the dried solid content (the powder particle), thereby obtaining a powder coating material.

Meanwhile, the above-described solid content (the powder particle) is a particle having the single layer structure.

Examples 2 to 5, Comparative Examples 1 to 3

The powder particle of the single layer structure is prepared in the same manner as in Example 1 except that types of the resin particle dispersions and the amount thereof (the resin amount) are changed as indicated in Table 1 in Example 1, and the powder coating materials of Examples 2 to 5 and Comparative Examples 1 to 3 are obtained by using the above prepared powder particles in the same manner as in Example 1.

Example 6

The powder particles having the single layer structure are prepared in the same manner as in Example 1 except that the resin particle dispersion A2 and the resin particle dispersion B1 are changed to the resin particle dispersion C1, and a powder coating material is obtained by using the prepared powder particles in the same manner as in Example 1.

Example 7

| Resin particle dispersion A3 | 117 parts (41 parts of resin amount) |
| Resin particle dispersion B3 | 96 parts (34 parts of resin amount) |
| Colorant dispersion (cyan) | 3.6 parts (0.9 parts of colorant) |
| Colorant dispersion (white) | 100 parts (25 parts of colorant) |
| Ion exchange water | 90 parts |

The respective dispersions and ion exchange water are sufficiently mixed and dispersed in a round-bottom stainless steel flask by using a homogenizer (ULTRA-TURRAX T50 manufactured by IKA Ltd.).

Then, a pH is adjusted to 2.5 with 1.0% aqueous nitric acid solution. 0.42 parts of 10% polyaluminum chloride aqueous solution is added into the flask and a dispersion operation is continuously performed with the homogenizer.

Thereafter, a stirring device and a mantle heater are installed in the round-bottom stainless steel flask, a temperature in the flask is increased up to 48° C. while the rotation rate of the stirring device is properly adjusted so that slurries are sufficiently stirred, and then after leaving the resultant for 20 minutes, 40 parts by weight (14 parts of the resin amount) of the resin particle dispersion A3 and 31 parts by weight (11 parts of the resin amount) of the resin particle dispersion B3 are added into the flask and are softly stirred. After leaving the resultant for 30 minutes, the pH is adjusted to 6.0 with 5% sodium hydroxide aqueous solution. Thereafter, the temperature is increased up to 80° C. and is kept for 1 hour.

After reaction is finished, the solution in the flask is cooled and filtered so as to obtain the solid content. Next, after this solid content is sufficiently cleaned with the ion exchange water, the solid-liquid separation is performed through the Nutsche-type suction filtration so as to obtain the solid content again.

Subsequently, this solid content is redispersed in 3 liters of the ion exchange water at 40° C., and then is cleaned by stirring the solid content at 300 rpm for 15 minutes. This cleaning operation is repeatedly performed 5 times, and the solid content obtained through the solid-liquid separation by using the Nutsche-type suction filtration is vacuum dried for 12 hours.

0.5 parts by weight of hydrophobic silica particles (16 nm of primary particle diameter) are mixed, as an external additive, with respect to 100 parts by weight of the dried solid content (the powder particle), thereby obtaining a powder coating material in Example 7.

Meanwhile, the above-described solid content (the powder particle) is a particle having the core/shell structure.

Example 8

| Resin particle dispersion A3 | 171 parts (resin amount: 60 parts) |
| Resin particle dispersion B3 | 114 parts (resin amount: 40 parts) |
| Ion exchange water | 90 parts |

The respective dispersions and ion exchange water are sufficiently mixed and dispersed in a round-bottom stainless steel flask by using a homogenizer (ULTRA-TURRAX T50 manufactured by IKA Ltd.).

Then, a pH is adjusted to 2.5 with 1.0% of aqueous nitric acid solution. 0.42 parts of 10% polyaluminum chloride aqueous solution is added into the flask and a dispersion operation is continuously performed with the homogenizer.

Thereafter, a stirring device and a mantle heater are installed in the round-bottom stainless steel flask, and a temperature in the flask is increased up to 48° C. while the rotation rate of the stirring device is properly adjusted so that slurries are sufficiently stirred. After leaving the resultant for 30 minutes as it is, the pH is adjusted to 6.0 with 5% of sodium hydroxide aqueous solution. Thereafter, the temperature is increased up to 80° C. and is kept for 1 hour.

After reaction is finished, the solution in the flask is cooled and filtered so as to obtain the solid content. Next, after this solid content is sufficiently cleaned with the ion exchange water, the solid-liquid separation is performed through the Nutsche-type suction filtration so as to obtain the solid content again.

Subsequently, this solid content is redispersed in 3 liters of the ion exchange water at 40° C., and then is cleaned by stirring the solid content at 300 rpm for 15minutes. This cleaning operation is repeatedly performed 5 times, and the solid content obtained through the solid-liquid separation by using the Nutsche-type suction filtration is vacuum dried for 12 hours.

0.5 parts by weight of hydrophobic silica particles (16 nm of primary particle diameter) is mixed, as an external additive, with respect to 100 parts by weight of the dried solid content (the powder particle), thereby obtaining a powder coating material in Example 8.

Meanwhile, the above-described solid content (the powder particle) is a particle having the single layer structure.

Example 9

| Resin particle dispersion C1 | 285 parts (100 parts of resin amount) |
| Colorant dispersion (cyan) | 3.6 parts (0.9 parts of colorant) |
| Colorant dispersion (white) | 100 parts (25 parts of colorant) |
| Ion exchange water | 90 parts |

The respective dispersions and ion exchange water are sufficiently mixed and dispersed in a round-bottom stainless steel flask by using a homogenizer (ULTRA-TURRAX T50 manufactured by IKA Ltd.).

Then, a pH is adjusted to 2.5 with 1.0% of aqueous nitric acid solution. 0.17 parts of 10% polyaluminum chloride aqueous solution is added into the flask and a dispersion operation is continuously performed with the homogenizer.

Thereafter, a stirring device and a mantle heater are installed in the round-bottom stainless steel flask, and a temperature in the flask is increased up to 48° C. while the rotation rate of the stirring device is properly adjusted so that slurries are sufficiently stirred. After leaving the resultant for 30 minutes as it is, 33 parts of 10% nitrilotriacetic acid (NTA) metal salt aqueous solution (Chelest 70: manufactured by Chelest Corporation) is added into the flask, and the pH is adjusted to 6.0 with 5% sodium hydroxide aqueous solution. Thereafter, the temperature is increased up to 81° C. and is kept for 1 hour.

After reaction is finished, the solution in the flask is cooled and filtered so as to obtain the solid content. Next, after this solid content is sufficiently cleaned with the ion exchange water, the solid-liquid separation is performed through the Nutsche-type suction filtration so as to obtain the solid content again.

Subsequently, this solid content is redispersed in 3 liters of the ion exchange water at 40° C., and then is cleaned by stirring the solid content at 300 rpm for 15 minutes. This cleaning operation is repeatedly performed 5 times, and the solid content obtained through the solid-liquid separation by using the Nutsche-type suction filtration is vacuum dried for 12 hours.

0.5 parts by weight of hydrophobic silica particles (16 nm of primary particle diameter) are mixed, as an external additive, with respect to 100 parts by weight of the dried solid content (the powder particle), thereby obtaining a powder coating material in Example 9.

Meanwhile, the above-described solid content (the powder particle) is a particle having the single layer structure.

Measurements and Evaluations

In the powder particle obtained from each of the Examples and Comparative Examples, the content (mmol/g) of each of the isocyanate group, the hydroxyl group, and the carboxyl group is measured by using the aforementioned methods, and the functional group molar ratio of [NCO/(COOH+OH)] is calculated.

In addition, with respect to the powder particle obtained from each of the Examples and Comparative Examples, each of the volume average particle diameter D50v, the volume average particle diameter distribution index GSDv, and the content of the metal ion (aluminum ion) is measured by using the aforementioned methods.

The results are shown in Table 2.

Evaluation

Preparation of Coating Film Sample of Powder Coating Material

A test panel formed of a cold rolled steel sheet which has a thickness of 0.6 mm and is applied with zinc phosphate treatment, is coated with the powder coating material prepared by the above method so that the film thickness thereof is 30 μm after burning, is burned at 170° C. for 1 hour, and then is cooled to room temperature, thereby obtaining a coating film sample.

Evaluation of Solvent Resistance of Coating Film

The surface of the coating film sample (the coated surface) is repeatedly rubbed 50 times by the cotton at a tip of a swab having a diameter of 1 cm, which is soaked in tetrahydrofuran (THF) in advance. The solvent resistance of the coating film is evaluated based on the following evaluation criteria.

A: rubbing resistance does not occur when the surface is rubbed, and there is no change between the coated surface after THF is dried and the coated surface in an area which is not rubbed B: rubbing resistance occurs when the surface is rubbed, but there is no change between the coated surface after THF is dried and the coated surface in an area which is not rubbed C: scratches are formed on the coated surface, or a portion of the area on the coated surface which is rubbed is dissolved Evaluation of Bending Resistance of Coating Film A coating film sample is placed on a metallic plate which is obtained by cutting a groove having a width of 15 mm and a depth of 18 mm, such that the coated surface faces the plate, a pressure is applied to a portion of the coating film sample which is on the groove of the plate by means of a wedge-shaped metallic rod, and the coating film sample is bent at 90 degrees. The bent portion of the coated surface is observed at 5 times loupe.

A: cracks are not formed in the bent portion on the coated surface, and little color change between the bent portion and other portions is recognized.

B: cracks are not formed in the bent portion on the coated surface, and color change between the bent portion and other portions is recognized.

C: cracks are formed in the bent portion on the coated surface

Evaluation of Blocking Resistance of Powder Coating Material

After storing the powder coating material obtained in each Example for 17 hours in a thermo-hygrostat chamber in which the temperature is controlled to 50° C. and the humidity is controlled to 50 RH %, an amount of the powder coating material passing through 200 mesh (aperture of 75 microns) is examined by using a vibration screen, and then the evaluation is performed based on the following evaluation criteria. As the value of the passed amount is increased, the powder particles are prevented from being aggregated to each other (high blocking resistance). In the following evaluation criteria, evaluation results of A and B are not problematic levels to be used when the powder coating material is stored at room temperature (25° C.).

A: passed amount is equal to or greater than 90%

B: passed amount is equal to or greater than 70% and less than 90%

C: passed amount is less than 70%

The specification and evaluation results of the respective Examples are shown in the list of Table 2.

TABLE 2

|  |  | Examples | | | | | | | | | Comparative Examples | | |
| --- | --- | --- | --- | --- | --- | --- | --- | --- | --- | --- | --- | --- | --- |
|  |  | 1 | 2 | 3 | 4 | 5 | 6 | 7 | 8 | 9 | 1 | 2 | 3 |
| Resin | A1 |  |  |  |  |  |  |  |  |  | 54 |  |  |
| particle | A2 | 50 | 60 |  |  |  |  |  |  |  |  | 70 |  |

TABLE 2-continued

| | | Examples | | | | | | | | | Comparative Examples | | |
|---|---|---|---|---|---|---|---|---|---|---|---|---|---|
| | | 1 | 2 | 3 | 4 | 5 | 6 | 7 | 8 | 9 | 1 | 2 | 3 |
| Dispersion No. (resin amount: part) | A3 | | | 55 | 64 | | | 55 | 60 | | | | |
| | A4 | | | | | | | | | | | | 65 |
| | A5 | | | | | 50 | | | | | | | |
| | B1 | 50 | 40 | | | | | | | | | 30 | |
| | B2 | | | | | | | | | | 46 | | |
| | B3 | | | 45 | 36 | | | 45 | 40 | | | | |
| | B4 | | | | | | | | | | | | 35 |
| | B5 | | | | | 50 | | | | | | | |
| | C1 | | | | | | 100 | | | 100 | | | |
| NCO/(OH + COOH) | | 0.67 | 0.92 | 0.8 | 1.12 | 0.67 | 0.96 | 0.80 | 0.96 | 0.96 | 0.37 | 1.27 | 1.14 |
| Content of NCO group [mmol/g] | | 0.4 | 0.48 | 0.99 | 1.15 | 0.4 | 0.78 | 0.99 | 1.08 | 0.78 | 0.38 | 0.56 | 1.43 |
| Form of powder particle | | Single layer | Single layer | Single layer | Single layer | Single layer | Single layer | Core/shell | Single layer | Single layer | Single layer | Single layer | Single layer |
| D50v [μm] | | 6.8 | 7.1 | 7.1 | 6.9 | 8.2 | 6.8 | 6.8 | 6.8 | 6.5 | 6.8 | 7 | 7.1 |
| GSDv | | 1.39 | 1.42 | 1.41 | 1.39 | 1.40 | 1.36 | 1.4 | 1.37 | 1.50 | 1.38 | 1.41 | 1.39 |
| Content of metal ion [% by weight] | | 0.11 | 0.1 | 0.9 | 0.1 | 0.09 | 0.1 | 0.12 | 0.1 | 0.002 | 0.1 | 0.08 | 0.1 |
| Solvent resistance | | B | B | A | A | A | A | A | A | A | C | C | B |
| Bending resistance | | B | B | A | B | A | A | A | B | A | C | C | C |
| Blocking resistance | | A | A | A | A | A | A | A | A | B | A | A | A |

As apparent from Table 2, the coating film excellent in both of the solvent resistance and the bending resistance may be obtained with the powder coating material in Examples compared with the powder coating material in Comparative Examples.

In addition, it is apparent that the powder coating material including the powder particles having a metal ion in amount of from 0.002% by weight to 0.2% by weight and a GSDv of less than 1.5 exhibits excellent blocking resistance, and the powder particles are prevented from being aggregated to each other.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A thermosetting powder coating material comprising: powder particles containing:
    a mixture of a vinyl resin A including a block isocyanate group and a carboxyl group and a vinyl resin B including a hydroxyl group and a carboxyl group, or
    a vinyl resin C including a block isocyanate group, a hydroxyl group, and a carboxyl group,
    wherein a content of the isocyanate group is from 0.4 mmol/g to 1.4 mmol/g, and a functional group molar ratio of [NCO/(COOH +OH)], which is obtained by dividing the content of the isocyanate group by a total content of the hydroxyl group and the carboxyl group, is from 0.5 to 1.2.

2. The thermosetting powder coating material according to claim 1,
    wherein the vinyl resin A is at least one resin obtained by polymerization of at least one monomer selected from the group consisting of styrene, butyl methacrylate, butyl acrylate, methyl methacrylate, and methylacrylate.

3. The thermosetting powder coating material according to claim 1,
    wherein the vinyl resin B is at least one resin obtained by polymerization of at least one monomer selected from the group consisting of hydroxyethyl methacrylate and hydroxyethyl acrylate.

4. The thermosetting powder coating material according to claim 1,
    wherein a volume average particle diameter distribution index GSDv of the powder particles is equal to or less than 1.5.

5. The thermosetting powder coating material according to claim 1,
    wherein the vinyl resins A to C each independently have a weight average molecular weight falling within the range of from 20,000 to 100,000.

6. The thermosetting powder coating material according to claim 1,
    wherein the powder particles are particles having a core/shell structure.

7. The thermosetting powder coating material according to claim 6,
    wherein any one of the vinyl resin A and the vinyl resin B is included in the core of the powder particles.

8. The thermosetting powder coating material according to claim 6,
    wherein the resin of the shell portion is equal to or greater than 90% by weight with respect to an entire shell portion.

9. The thermosetting powder coating material according to claim 6, wherein a coverage of the shell portion is from 30% to 100%.

10. The thermosetting powder coating material according to claim 6,
wherein a thickness of the shell portion is from 0.2μm to 4μm.

11. The thermosetting powder coating material according to claim 1,
wherein the powder particles contain a di- or higher-valent metal ion in an amount of from 0.002% by weight to 0.2% by weight.

12. The thermosetting powder coating material according to claim 11,
wherein the metal ion is at least one metal ion selected from the group consisting of aluminum ion, magnesium ion, iron ion, zinc ion, and calcium ion.

13. The thermosetting powder coating material according to claim 1, further comprising a colorant in an amount of from 1% by weight to 70% by weight with respect to the entire resins contained in the powder particles.

14. The thermosetting powder coating material according to claim 13,
wherein the colorant includes titanium.

15. The thermosetting powder coating material according to claim 1,
wherein a volume average particle diameter D50v of the powder particles is from 1 μm to 25μm.

16. The thermosetting powder coating material according to claim 1,
further comprising inorganic particles as an external additive.

17. The thermosetting powder coating material according to claim 16,
wherein the inorganic particles include silica or titania.

18. The thermosetting powder coating material according to claim 16,
wherein the inorganic particles are those subjected to a hydrophobizing treatment.

19. The thermosetting powder coating material according to claim 1,
wherein the powder particles are those obtained by: aggregating at least resin particles which include the vinyl resin A and resin particles which include the vinyl resin B, which are dispersed in a dispersion, or at least resin particles which include the vinyl resin C and are dispersed in a dispersion to form aggregated particles; and coalescing the aggregated particles by heating.

20. A coated article comprising a coating film formed on a surface of a material to be coated, with the thermosetting powder coating material according to claim 1.

* * * * *